No. 819,641. PATENTED MAY 1, 1906.
W. S. FILLEY.
DENTAL PLATE MACHINE.
APPLICATION FILED NOV. 23, 1904.

2 SHEETS—SHEET 1.

Inventor
W. S. Filley

No. 819,641. PATENTED MAY 1, 1906.
W. S. FILLEY.
DENTAL PLATE MACHINE.
APPLICATION FILED NOV. 23, 1904.
2 SHEETS—SHEET 2.
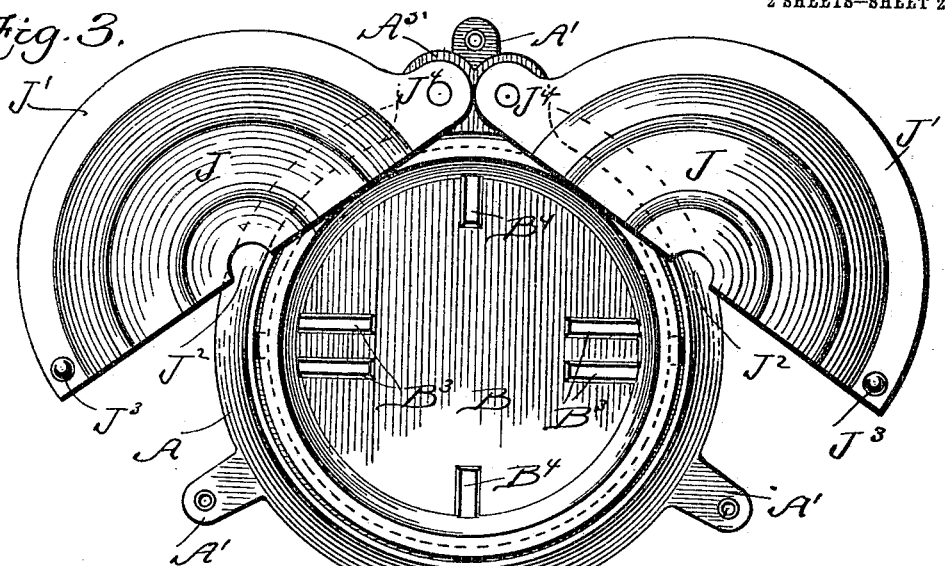
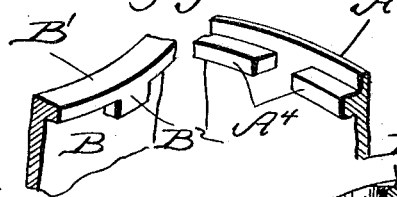
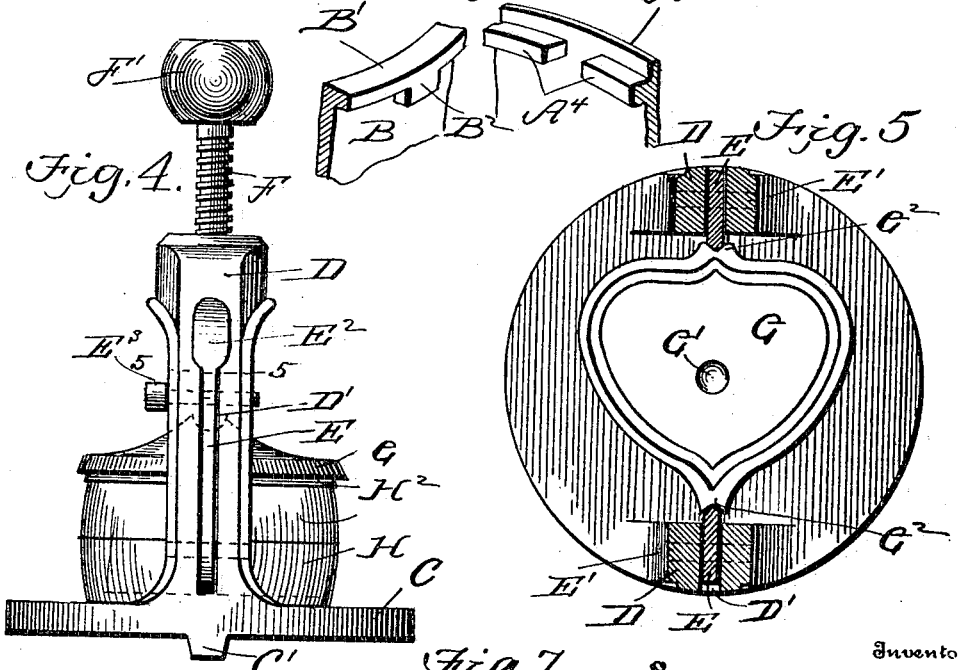
Inventor
W. S. Filley.

UNITED STATES PATENT OFFICE.

WILLIAM S. FILLEY, OF MONTPELIER, OHIO.

DENTAL-PLATE MACHINE.

No. 819,641.   Specification of Letters Patent.   Patented May 1, 1906.

Application filed November 23, 1904. Serial No. 234,014.

*To all whom it may concern:*

Be it known that I, WILLIAM S. FILLEY, a citizen of the United States, residing at Montpelier, in the county of Williams and State of Ohio, have invented a new and useful Dental-Plate Machine, of which the following is a specification.

This invention relates to a device for preparing rose-pearl or celluloid dental plates, and comprises a boiler and press, the object of the device being the preparation of the material of which the plate is composed so that it will retain its natural color and not bleach, as is the case with celluloid softened by the use of steam or dry heat.

The invention consists of a receptacle adapted to be heated and to hold suspended therein a removable boiler, a receptacle arranged in and removable from the boiler adapted to contain the ingredients of the plate, and a press adapted to force down the cover of the receptacle while in position in the boiler.

The invention also consists of the novel features of construction hereinafter set forth, pointed out in the claims, and shown in the accompanying drawings, in which—

Figure 1:
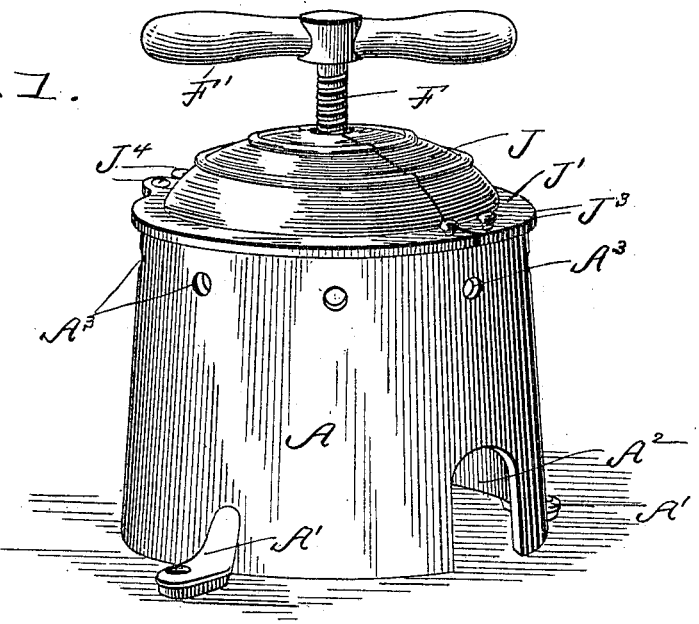
Figure 2:
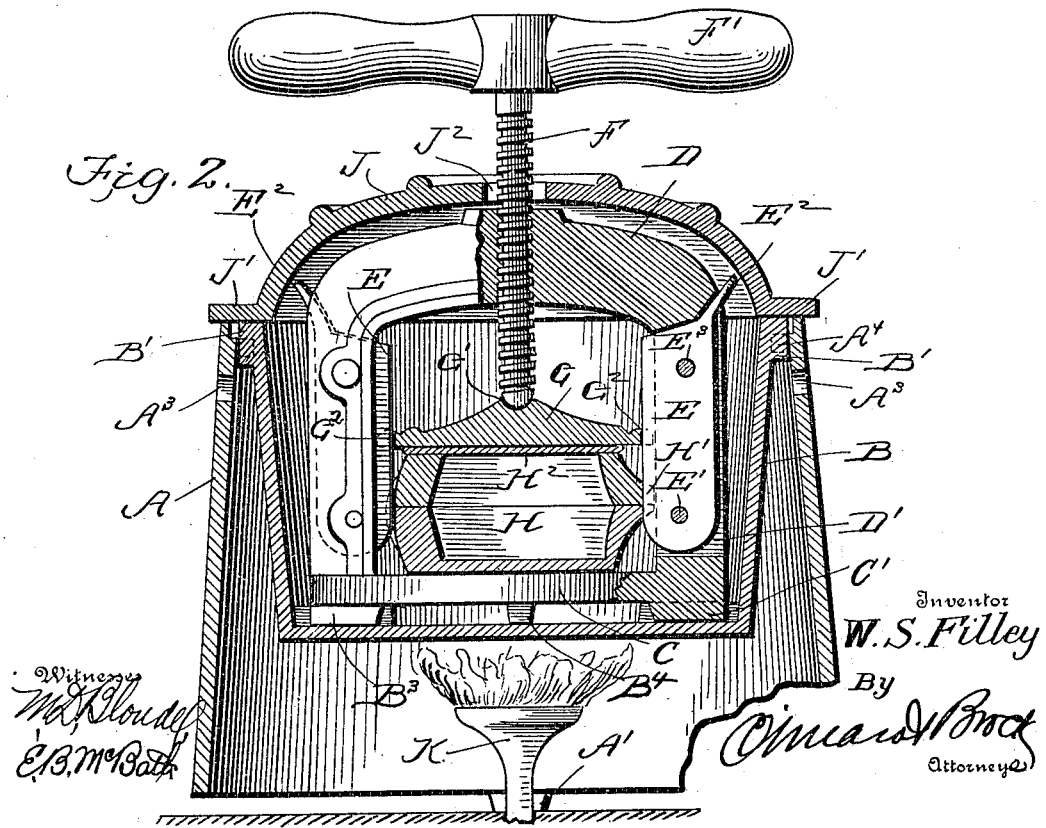

Figure 1 is a perspective view of the device complete. Fig. 2 is a vertical section therethrough. Fig. 3 is a plan view, the covers being shown in open position. Fig. 4 is a detail vertical elevation of the press and receptacle. Fig. 5 is a section on the line 5 5 of Fig. 4. Fig. 6 is a detail perspective view of parts of the heating-chamber and the boiler, showing the manner in which the boiler is suspended in the heating-chamber. Fig. 7 is a detail partial plan view of the receptacle contained in the boiler.

In the drawings, A represents a heating-chamber upwardly and downwardly open and preferably conical in form, being of greater diameter at the bottom than at the top. Shoes A' are carried by the chamber A, by means of which it may be attached to a table by screws passing through threaded apertures in the shoes and by means of which the lower edge of the chamber A is elevated above the table, permitting free entrance of air to the interior. An opening $A^2$ is formed in one side of the chamber, through which the flame or action of the heating apparatus may be observed. Perforations $A^3$ are formed in the sides of the chamber A adjacent the top, through which products of combustion may escape.

The boiler B is of less height than the chamber A and has its greatest diameter at the top, so that when in position its sides are divergent with respect to the sides of the chamber A. The boiler is provided with a flange B', which flange carries lugs $B^2$, and lugs $A^4$ are formed on the inner sides of the chamber A and arranged in pairs spaced apart. The flange B' of the boiler B rests on the lugs $A^4$, and the lugs $B^2$ rest between the pairs of lugs $A^4$, thereby preventing rotation of the boiler within the chamber A. Within and on the bottom of the boiler I arrange lugs $B^3$, arranged in pairs on opposite sides of the boiler, and intermediate these pairs single lugs $B^4$. The press comprises a bottom plate C, having on its under side lugs C', which fit between the lugs $B^3$ of each pair, the plate resting on and being steadied by the lugs $B^4$. These lugs also serve to lift the plate above the bottom of the boiler. The plate C carries an upright yoke D, which has its side members vertically slotted, as shown at D', and in these slots are pivoted movable plates E, the plates being secured in the slots by pivot-pins E', which pass through the side members of the yoke and the plates adjacent their lower ends. The plates E at their upper ends are provided with outwardly-projecting lips $E^2$, which provide convenient means for gripping the plates with the fingers and adjusting them. It will be understood that the plates swing in and out of the slots in the yoke, and in their inner position are locked by removable pins $E^3$, which pass through suitable alining perforations formed in the side members of the yoke and in the plates adjacent their upper ends. A screw F works through a threaded aperture in the bow portion of the yoke D and is provided with a handle F'. Within the boiler I place a receptacle H, which is carried by the plate C, and this receptacle I make in two sections, the upper section resting on the lower one. This receptacle is preferably heart-shaped and is provided with projecting bifurcated lips H', adapted to be engaged by the inner edges of the adjustable plates E, which not only serve as guides in placing the parts in position, but also lock the receptacle and other parts to be mentioned against rotation or movement on the plate C. A suitable flat cover $H^2$ is provided for the receptacle H.

A casting G is adapted to rest on the cover $H^2$ and has on its upper face an indentation G', adapted to receive the lower blunt end of the screw F. The casting is also provided with bifurcated lips G², similar to those at H' on the receptacle H and for the same purpose. The cover J is curved or dome-shaped and is divided diametrically into two sections. These sections carry flanges J', adapted to rest upon the upper edges of both the heating-chamber A and the boiler B. On the meeting edges of the cover-sections are formed notches J², whereby an opening is provided when the cover is closed for the passage of the screw F. The plates J are also formed with lugs J⁴, which overlap lugs A⁵, carried by the upper edge of the receptacle or chamber A and to which the cover-sections J are pivoted in any desired manner. Knobs J³ are also carried by the cover-sections, by which they may be conveniently handled. By having the cover-sections curved or dome-shaped instead of flat steam arising from the boiler is condensed and returns to the boiler.

The chamber A is placed over a suitable burner, a lamp, or gas-jet K, as may be desired.

In use the parts are assembled in the manner shown in Fig. 2. At the commencement of the operation the cover J is opened and the screw F raised in the yoke to its highest point. The receptacle H, with the blank of celluloid, is placed on the plate C, and the top H² and casting G placed on top of the celluloid, and the whole set into the boiler, which is placed in position in the chamber A. The adjustable guide-plates E are locked in position by the pins E³ before the devices just mentioned are placed in the boiler, and the plates will guide the cover and casting G as the screw is turned down, so that the cover will seat properly upon the receptacle H. Before closing the cover J, I put in a suitable liquid preparation. After the cover is closed the liquid is brought to a boiling-point and the screw then rotated until it commences to turn hard. Rotation is then stopped for about two minutes and then resumed, and this operation is repeated until the cover H² is seated. In practice I have found that about ten minutes was required to complete the operation after the boiling-point had been reached.

While I do not limit myself to any special liquid preparation, the formula which I have found saitsfactory is composed of eighty per cent. glycerin and twenty per cent. lard-oil, to which is added mineral coloring-matter to secure the desired tint or shade of color. A celluloid plate prepared in this manner will retain its color and not bleach, as is the case with plates prepared by means of steam or dry heat.

Having thus fully described my invention, what I claim as new, and desire to secure by Letters Patent, is—

1. A device of the kind described, a press having a bottom plate, an upright yoke carried by the plate, said yoke having its side members vertically slotted, plates pivotally secured in said slots adjacent their lower ends, the plates having outwardly-projecting lips at their upper ends, locking-pins passing through the side members of the yoke, and a receptacle adapted to rest on the bottom plate and having bifurcated lips engaged by the pivoted plates.

2. In a device of the kind described, a press comprising a plate, a yoke carried thereon and having vertically-slotted side members, adjustable plates pivoted in said slots, a screw working through the yoke, a receptacle adapted to rest on the plate and to be engaged by the adjustable plates, and a cover for the receptacle adapted to be guided into position by the said plates.

3. A device of the kind described comprising a heating-chamber, means of heating the chamber, a boiler suspended therein, a press adapted to rest in the boiler and having an upwardly-extending screw, a sectional cover carried by the chamber and adapted to cover the boiler and fit loosely around the screw, a receptacle adapted to rest in the press, adjustable plates carried by the press, and a casting having bifurcated lips adapted to be engaged by the said plates, said casting being adapted to be engaged by the screw and to be forced downward between the plates and close the receptacle, as and for the purpose set forth.

WILLIAM S. FILLEY.

Witnesses:
GEORGE C. HOOD,
D. A. WEBSTER.